Patented Feb. 16, 1937

2,070,581

UNITED STATES PATENT OFFICE 2,070,581

GUANIDINE PHOSPHATE FERTILIZER

Harry A. Curtis, Knoxville, Tenn., assignor to Tennessee Valley Authority, Wilson Dam, Ala., a corporation No Drawing. Application August 23, 1935, Serial No. 37,534

6 Claims. (Cl. 71—29)

(Granted under the act of March 3, 1883, as amended April 30, 1928; 370 O. G. 757)

This application is made under the act of March 3, 1883 as amended April 30, 1928, and the invention herein described, if patented, may be manufactured and used by or for the Government for governmental purposes without the payment to me of any royalty thereon.

This invention relates to fertilizer compositions and particularly those which contain a guanidine salt as an essential constituent.

One of the objects of this invention is to provide an improved superphosphate containing more than one element essential as a plant food. Another object of this invention is to provide a composition which contains both inorganic and organic nitrogen. Still another object of this invention is to provide a fertilizer composition in which the constituent which contains the organic nitrogen is derived from an economical source not hitherto made extensively available for fertilizer use. Another object of this invention is to provide a fertilizer which contains a substantial proportion of water-soluble organic nitrogen. Other objects of this invention include the provision for a fertilizer composition which contains a high percentage of organic nitrogen.

I have produced a new and improved superphosphate fertilizer which contains nitrogen as an essential element in the form of a guanidine salt.

One example for the production of the improved fertilizer composition which lies within the scope of this invention is given as follows: A triple superphosphate, which is essentially mono-calcium phosphate, is treated with a nitrifying composition which contains approximately 23% by weight of ammonia and 27% by weight of guanidine, so that the ratio of the inorganic nitrogen to the organic nitrogen is 1 to 1. The principal constituents of the resulting product are mono-calcium phosphate, di-calcium phosphate, mono-ammonium phosphate and di-ammonium phosphate, and guanidine phosphate.

A second example for the production of the improved fertilizer composition is given below: A triple superphosphate is treated with a nitrifying solution which contains approximately 37% by weight of ammonia and 13% by weight of tri-guanidine phosphate, so that the ratio of the inorganic nitrogen to the organic nitrogen is 5:1. The principal constituents of the resulting product are mono-calcium phosphate, di-calcium phosphate, mono-ammonium phosphate, di-ammonium phosphate and guanidine phosphate.

A third example for the production of this improved fertilizer composition follows: A triple superphosphate is treated with a liquid mixture of a solution containing approximately 40% by weight of free ammonia and 10% by weight of di-guanidine sulfate, together with calcium sulfate in suspension. The principal constituents of the resulting product are mono-calcium phosphate, di-calcium phosphate, mono-ammonium phosphate, di-ammonium phosphate, guanidine phosphate and calcium sulfate.

It is evident that here are numerous factors which will influence conditions for the most satisfactory production and use of the compositions covered by this invention, the actual limits of which cannot be established except by detailed study of each set of raw materials and finished products involved. The superphosphate, which is nitrified, may be of the character normally used for ammoniation with aqueous or anhydrous ammonia and other nitrifying compositions. The finished fertilizer composition may contain a variety of constituents, depending upon the nature of the superphosphate used and the specific nature of the nitrifying composition employed. A superphosphate treated with a liquid containing ammonia and guanidine may produce a guanidine phosphate fertilizer which contains a substantial proportion of unchanged mono-calcium phosphate, together with di-calcium phosphate, mono-ammonium phosphate, di-ammonium phosphate and guanidine phosphate. Similarly on using a nitrifying composition which contains guanidine phosphate in solution, a product will result which contains guanidine phosphate. When a liquid nitrifying composition, which contains a solution of guanidine sulfate, is used, the product will also contain some calcium sulfate, as will be the case when the nitrifying solution carries some calcium sulfate in suspension. The guanidine salt in this new composition may be that of any mineral acid but the phosphate and sulfate are preferred.

It will be seen, therefore, that this invention actually may be carried out by the modification of certain details without departing from its spirit or scope.

I claim:
1. A fertilizer containing calcium phosphate, ammonium phosphate, and guanidine phosphate.
2. A fertilizer containing calcium phosphate, ammonium phosphate and a guanidine salt.
3. A fertilizer containing mono-calcium phosphate and guanidine phosphate.
4. A fertilizer containing mono-calcium phosphate and a guanidine salt.
5. A superphosphate fertilizer containing as an essential constituent a guandidine phosphate.
6. A superphosphate fertilizer containing as an essential constituent a guanidine salt.

HARRY A. CURTIS.